United States Patent [19]

Cartwright et al.

[11] Patent Number: 4,775,301

[45] Date of Patent: Oct. 4, 1988

[54] OSCILLATING ELECTROMAGNETIC PUMP WITH ONE-WAY DIAPHRAGM VALVES

[76] Inventors: Garry E. Cartwright, 28 Hathaway Gardens, Waterlooville, Hampshire; Paul Palmer, 8 St. Matthews Road, Cosham, Hampshire, both of United Kingdom

[21] Appl. No.: 145,738

[22] Filed: Jan. 19, 1988

Related U.S. Application Data

[63] Continuation of Ser. No. 879,363, Jun. 27, 1986, abandoned.

[51] Int. Cl.$^4$ .................... F04B 17/04; F04B 21/02
[52] U.S. Cl. ............................ 417/417; 417/530; 417/566; 137/859
[58] Field of Search ........... 417/417, 550, 567, 566; 92/244; 137/512.15, 859

[56] References Cited

U.S. PATENT DOCUMENTS

| | | | |
|---|---|---|---|
| 2,970,021 | 1/1961 | Glaser et al. | 92/244 |
| 3,160,329 | 12/1964 | Radic et al. | 137/859 |
| 4,324,097 | 4/1982 | Schmitt et al. | 137/512.5 |
| 4,376,449 | 3/1983 | Nelson et al. | 417/417 |

FOREIGN PATENT DOCUMENTS

| | | |
|---|---|---|
| 2377140 | 8/1978 | France . |
| 1550265 | 7/1969 | Fed. Rep. of Germany . |
| 1054366 | 4/1963 | United Kingdom . |
| 1055066 | 1/1967 | United Kingdom . |
| 1157573 | 7/1969 | United Kingdom ........... 137/859 |
| 1475679 | 6/1977 | United Kingdom . |
| 1484674 | 9/1977 | United Kingdom . |

*Primary Examiner*—Carlton R. Croyle
*Assistant Examiner*—Leonard P. Walnoha
*Attorney, Agent, or Firm*—Parkhurst, Oliff & Berridge

[57] ABSTRACT

An oscillatory pump includes a cylinder (9) having normally-closed valves (10,13) of flexible material fixedly located at the inlet ($A_c$) and outlet ($B_c$) ends of the cylinder (9), and a piston (1) having an inlet ($A_p$) and an outlet ($B_p$). The piston (1) is reciprocatable within the cylinder (9) and is provided with a further valve (6) of flexible material movable with the piston (1) and located at the outlet end ($B_p$) of the piston (1). The piston (1) is constructed to allow fluid to pass from an inlet chamber (C1) formed between the inlet valve (10) and the inlet end ($A_p$) of the piston (1) to an outlet chamber (C2) formed between the further valve (6) and the outlet valve (13) in response of the piston (1) within the cylinder (9). The valve includes a valve seat having a generally conical first surface portion and a second surface portion located radially inwardly of the first surface portion and extending generally parallel to the axis of the first surface portion. A generally annular valve member has a tip portion for gripping the second surface portion of the valve seat with an interference fit only between the tip portion and the valve seat. A mechanism is provided for effecting reciprocatory movement of the piston (1) within the cylinder (9).

10 Claims, 5 Drawing Sheets

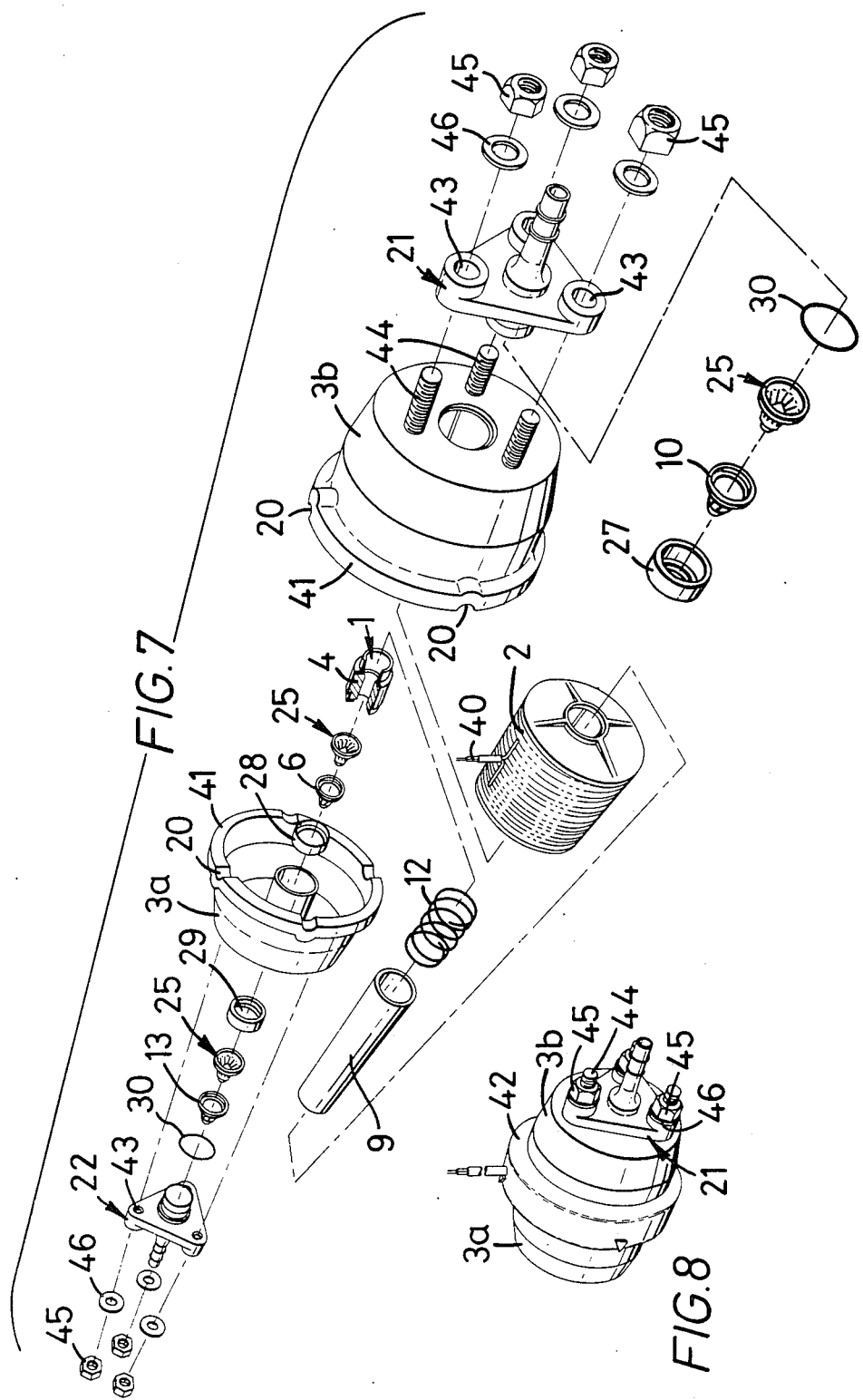

OSCILLATING ELECTROMAGNETIC PUMP WITH ONE-WAY DIAPHRAGM VALVES

This application is a continuation of U.S. Ser. No. 879,363, filed June 27, 1986 and now abandoned.

BACKGROUND AND SUMMARY OF THE INVENTION

This invention relates to fluid pumps of the oscillatory type and in particular but not exclusively relates to an electromagnetically operated oscillatory pump, although the pump of the present invention may be operated by other means. The invention also relates to one-way valves which are particularly suitable for such pumps but are also suitable for other uses.

French Certificat d'Utilite No. 2377140 and German Offenlegungsschrift No. 1550265 describe one-way valves with conical valve seats. While these valves provide improvements in the art, they have the disadvantage that because of the simple conical shape of the valve seats, the flexible valve members can tend to lift off the valve seats under high back pressure thereby allowing leakage. With this shape of valve seat, it is also necessary to have very small tolerances in the manufacture of the flexible valve member so that it fits very closely to the valve seat. These prior art valves are also designed for permanent stationary mounting and are not adapted nor appropriate for the rigorous conditions which pertain in dynamic situations such as with an oscillatory pump where the moving piston member is hollow and is fitted with a one-way valve.

The invention accordingly seeks to improve on these prior art constructions.

According to the invention there is provided a one-way valve comprising a housing defining a passageway therethrough, a valve seat located generally centrally of the passageway, and a generally annular flexible valve member secured at its periphery to the housing and extending over the valve seat, the member being arranged so that excess pressure across the valve member in one direction along the passageway causes the flexible member to extend away from the valve seat thereby permitting fluid flow in the said one direction, whereas excess pressure in the other direction urges the flexible member to seal against the valve seat thereby preventing fluid flow in the said other direction, the valve seat having a first surface portion which is generally conical and a second surface portion located radially inwardly of the first portion and extending generally parallel to the axis of the generally conical first portion, the valve member preventing flow by engagement with at least the second surface portion.

According to the invention there is also provided an oscillatory pump comprising a cylinder having inlet and outlet ends, a piston having a passageway therethrough and reciprocatable within the cylinder, the piston having a one-way valve arranged to open and close the passageway in the piston, and means for effecting reciprocatory movement of the piston whereby to pump fluid from the cylinder inlet to the cylinder outlet, the valve comprising a valve seat located generally centrally of the passageway, and a generally annular flexible valve member secured at its periphery to the housing and extending over the valve seat, the member being arranged so that excess pressure across the valve member in one direction along the passageway causes the flexible member to extend away from the valve seat thereby permitting fluid flow in the said one direction relative to the piston, whereas excess pressure in the other direction urges the flexible member to seal against the valve seat thereby preventing fluid flow in the said other direction relative to the piston.

BRIEF DESCRIPTION OF THE DRAWINGS

Embodiments of the invention will now be described by way of example only, with reference to the accompanying drawings, wherein:

FIG. 7 is an exploded perspective view of the embodiment of FIG. 6 and

FIG. 8 is a perspective view of the embodiment of FIGS. 6 and 7.

DETAILED DESCRIPTION OF THE PREFERRED EMBODIMENTS

Figure 1:
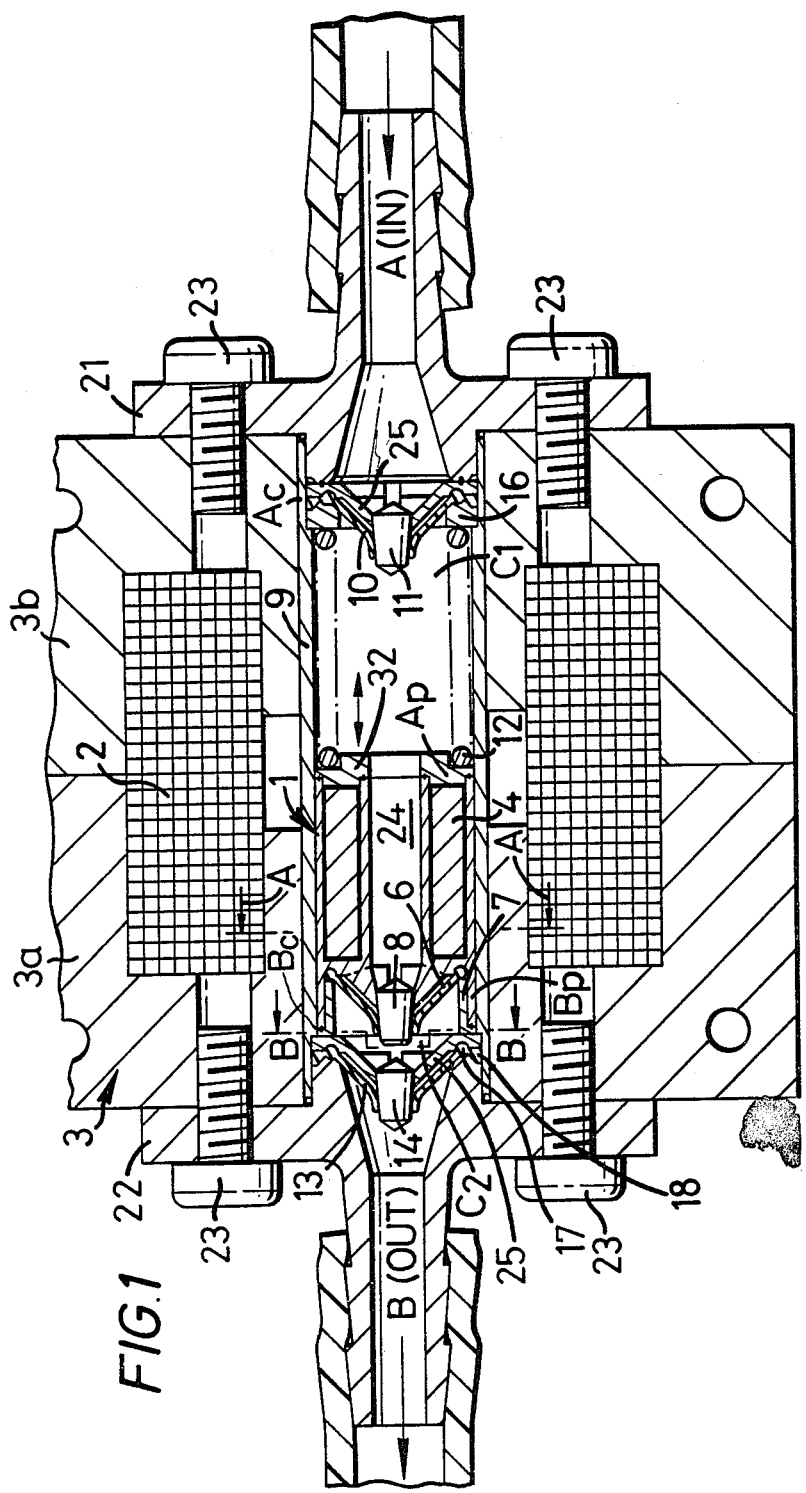
FIG. 1 is a sectional view of an oscillatory pump according to the present invention and having three valves of the invention.
Figure 2:
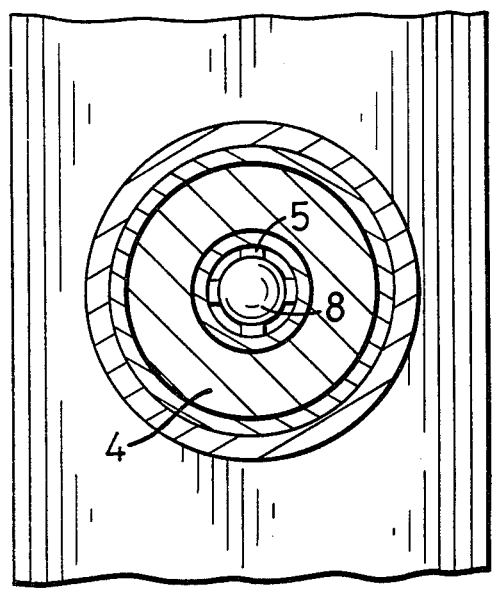
FIG. 2 is a sectional view taken on the line A—A of FIG. 1.
Figure 3:
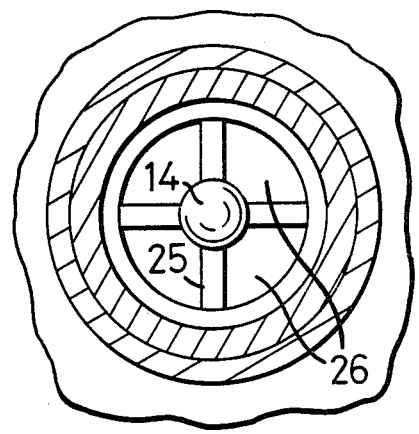
FIG. 3 is a sectional view taken on the line B—B of FIG. 1.

The pumps shown in the drawings are electromagnetically operable but as previously indicated, any means may be employed to effect reciprocation of the piston within the cylinder and the electromagnetically operable pump is described by way of example only to illustrate in a convenient way the principle of operation of the pump.

Thus, as shown in FIG. 1, the piston 1 forms an armature located in the magnetic field of an electromagnetic transducer, the coil of which is shown at 2 and the laminations of the stator at 3. The coil 2 is mounted in a cavity in the stator 3, the stator being in two portions 3a, 3b secured together by welding or other suitable means. Inlet and outlet housing members 21, 22 are attached to the stator portions 3b and 3a respectively by screws 23.

The piston 1 comprises a slug 4 of ferro-magnetic or ferri-magnetic material enclosed by a plastic housing 32 which defines a through passageway 24. The housing is formed with transfer ports or channels 5 to allow fluid to pass from the inlet end A (IN) of the pump to the outlet end B (OUT) thereof. The outlet end $B_p$ of the piston 1 is formed with a valve movable with the piston 1, having a flexible valve member 6 of an elastic, flexible material normally in contact with a tapered pintle 8, forming a valve seat, such as normally to close the valve.

The piston 1 is arranged to reciprocate within cylinder 9 located within the stator assembly 3 of the transducer and the inlet end $A_c$ of the cylinder 9 is provided with a stationary valve the flexible portion 10 of which is normally in contact with the tapered pintle 11. A compression spring 12 is located between the inlet end $A_c$ of the cylinder 9 and inlet end $A_p$ of the piston 1.

At the outlet end $B_c$ of the cylinder 9, a stationary flexible valve is provided with the flexibe portion 13 normally in contact with a tapered pintle 14. For the purposes of illustrating the operation of the pump, the chamber formed between the inlet end $A_c$ of the cylinder and the inlet end $A_p$ of the piston 1 will be referred to as "chamber C1" whilst the chamber formed between the outlet end $B_p$ of the piston, i.e. beyond the valve 6, and the valve or seal 13 will be referred to as "chamber C2".

The pump operates as follows:

When the coil of the electromagnetic transducer is energised, the slug 4 will traverse the magnetic field thereof and is arranged to move initially to the right in FIG. 1. Fluid initially enters chamber C1 through valve 10 but as the piston 1 moves to the right, compressing the compression spring 12 and reducing the volume of chamber C1, the pressure exerted on the fluid in chamber C1 causes the flexible portion 10 of the inlet valve to close around the fixed pintle 11 to prevent fluid entering chamber C1 from the inlet end of the pump. The pressurized fluid in chamber C1 is directed through the channels 5 of the piston 1 and forces the flexible portion 6 of the valve in the piston away from the valve seat 8, to open the valve and allow the fluid to pass into chamber C2. At this stage of the pump cycle, the coil 2 is de-energised and the spring is permitted to expand to move the piston 1 to the left in FIG. 1. This has the effect of reducing the volume of chamber C2 and increasing the pressure of the fluid therein, causing the flexible portion 6 to close onto the valve seat 8. The pressure exerted by the piston 1 on the fluid in chamber C2 causes the flexible portion 13 of the outlet valve to move away from the valve seat 14 to allow the fluid in chamber C2 to pass to the pump outlet $B_c$.

The piston 1 moving to the left also increases the volume of chamber C1 and a partial vacuum is formed which allows the flexible portion of inlet valve 10 to be moved away from the valve seat by fluid from the inlet end A of the pump, thereby allowing fluid to enter chamber 1. The cycle is then repeated by again energizing the coil 2 of the transducer.

The three valves are all basically similar and will now be described in further detail, referring specifically to the cylinder outlet valve. Pintle 14 forms part of a valve seat member 25, having four holes 26 formed therethrough for fluid flow. The valve seat member of the valve in the piston is integral with the piston, the channels 5 forming the through holes, but the valve seat members of the cylinder inlet and outlet valves are located within the cylinder 9.

The flexible valve members 13, 10 and 6 are annular and are clamped at their peripheral enlargements 17 between their corresponding valve seat members and outlet housing member 22, annular member 16 and piston insert 7 respectively. Valve members 13 and 10 (not 6) also have a peripheral extension bead 18 which seals against the cylinder 9, preventing fluid leakage between the housing members 22, 21 and the cylinder 9. Valve seat member 25 of the outlet valve and annular member 16 seat against internal shoulders in the cylinder 9.

Figure 4:
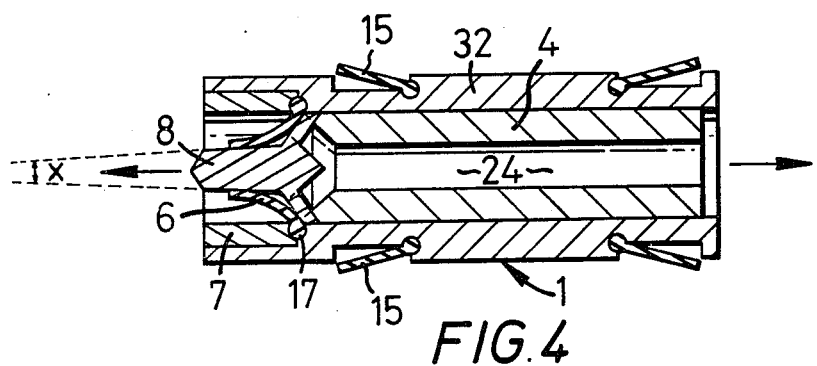
FIG. 4 is a sectional view of a modified piston.

The annular valve member 13 is of resilient, elastic material such as rubber or synthetic rubber, and extends inwardly and in a downstream direction, generally at 45°, to seal against the pintle 14. The surface of the pintle engaged by the valve member is generally longitudinal of the pump, and in the example shown is conical. The relative dimensions of the pintle and the central hole in the valve member are preferably such that the valve member grips the pintle under equilibrium conditions. As will have been understood, excess pressure in a downstream direction causes the valve to open, the flexible member dilating, extending elastically and creating an annular gap between the pintle and the inner periphery of the flexible member, while excess pressure in the reverse direction causes the valve member to seal against the pintle.

Where the pump is used for pumping at high pressure and/or for pumping gas such as air, the piston may be provided with resilient annular skirt seals 15 as shown in the piston of FIG. 4, to prevent leakage between the piston and cylinder. For liquids and/or low pressure pumping, such seals will normally be unnecessary as leakage through the small annular clearance between piston and cylinder will be negligible.

The pump when operated electromagnetically will operate off any alternating current supply and at most standard voltage levels. The pump is of a lightweight construction and can be produced entirely from non-toxic materials allowing the pump to be used with safety for pumping fluids such as beverages, alcoholic and non-alcoholic drinks etc. The pump may be dimensioned such that for each cycle, a predetermined volume of fluid is dispensed from the outlet end B of the pump.

Figure 5:
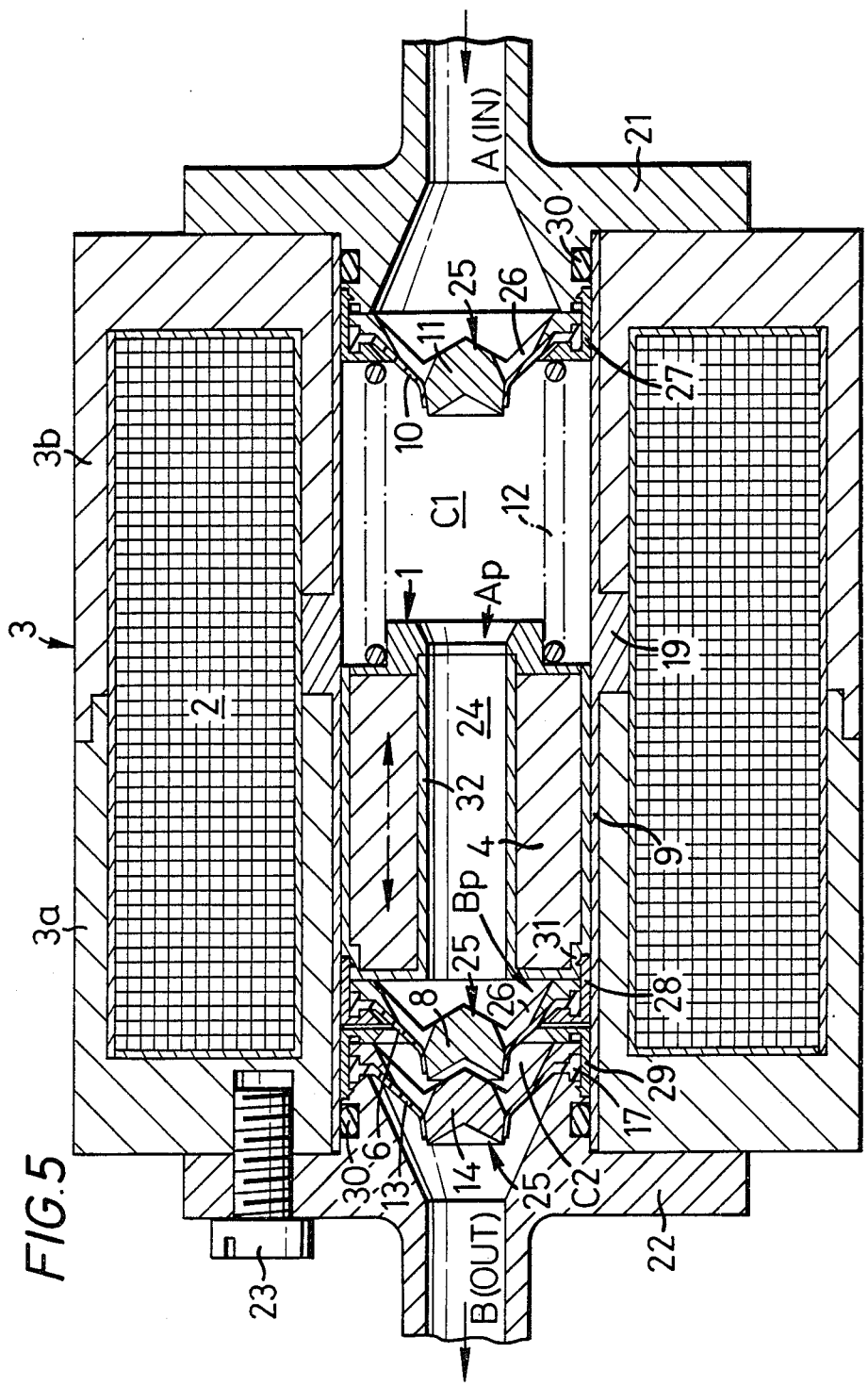
FIG. 5 is a sectional elevation, corresponding to FIG. 1, of a modified version of the pump.

FIG. 5 shows a modified pump but which is similar in most respects to the pump of FIG. 1, similar elements being shown by the same reference numerals as in FIG. 1. The stator 3 is in two portions 3a, 3b which together house the coil 2 and hold between them a radial extension 19 of the cylinder 9. Cylinder 9 with radial extension 19 are of a low magnetic permeability material such as plastic. The three valve members 6, 10, 13 are identical and have rectangularly shaped peripheral enlargements 17 held between identical valve seat members 25 and annular members 28, 27 and 22 respectively. Neither the cylinder inlet valve nor the cylinder outlet valve have radial extensions corresponding to 18 in FIG. 1, the necessary seals between the housing members 21, 22 and the cylinder 9 being provided by O-rings 30. As will be seen from FIG. 5, identical annular members 27, 28 and 29 have a small inner peripheral barb 31 for snap fitting engagement in a corresponding circular groove in the housing member 21, piston 1 and housing member 22 respectively. For simplicity, only one screw 23 is shown. It will however be understood that in practice an appropriate number of screws 23 will be provided at each end to attach the outer housing members 21, 22 to the stator 3.

In the embodiments of FIGS. 1–5, the piston is formed by a two-part housing which encloses the slug 4. However, the piston may be moulded integrally around the slug 4 in manufacture. For pumping beverages, preferred materials are acetal resin for the piston housing, mild steel for the slug 4 and PTFE for the cylinder. For pumping liquids such as fuel which do not require the plastic housing protection for the mild steel slug, the housing and slug may be formed as a single integral member of mild steel, with the cylinder for example being of stainless steel.

Figure 6:
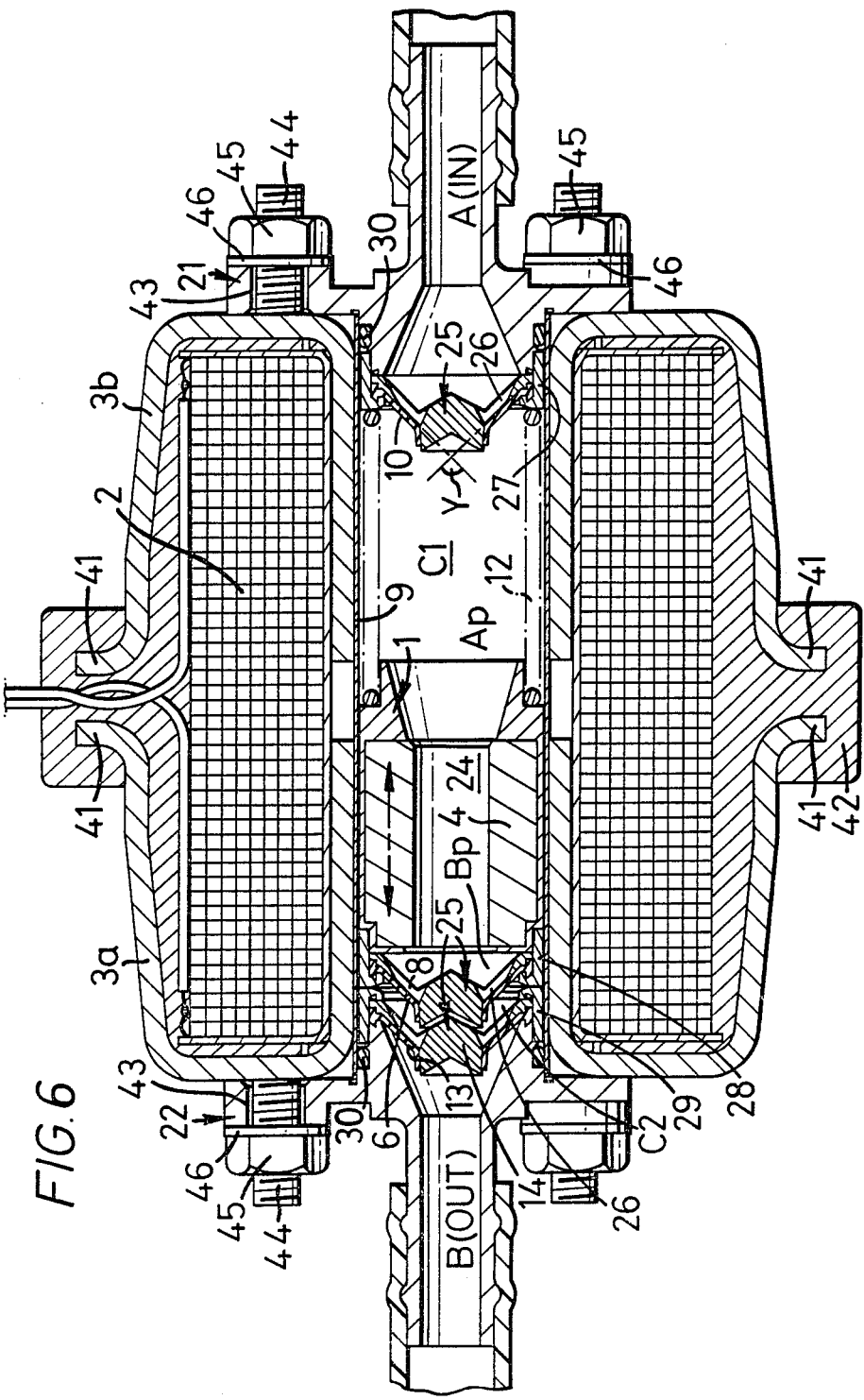
FIG. 6 is a sectional elevation, corresponding to FIGS. 1 and 5, of a further modified version of the pump.

FIGS. 6, 7 and 8 show a further modified pump which again is similar in many respects to the pumps of FIGS. 1–5, and equivalent elements are similarly shown by the same reference numerals.

The power supply, generally half-wave rectified mains AC but alternatively electronically chopped DC, is supplied to the stator coil 2 via wires 40.

In this embodiment, the stator portions 3a, 3b are not laminated but are formed from mild steel. These portions are provided with outwardly extending flanges 41 formed with semi-cylindrical hole portions 20. When the pump is assembled and the portions 3a, 3b brought together so that their flanges 41 contact each other, these hole portions 20 form complete cylindrical holes. The final stage in the assembly is the injection moulding in-situ of a plastic ring 42; during this moulding, the plastic flows in through the holes formed by the hole portions 20 and around the stator coil 2.

The outer housing members or end plates 21, 22 are each formed with three holes 43 through which extend threaded rods 44 welded to the stator portions 3a, 3b. Nuts 45 and washers 46 secure the end plates 21, 22 to the stator portions 3a, 3b by conventional threaded engagement. An optional alternative to this arrangement of threaded rods 44, nuts 45 and washers 46 is to have holes formed in the stator portions 3a, 3b aligned with the holes 43 in the end plates 21, 22. When the ring 42 is moulded, the plastic will flow out of these holes in the stator portions 3a, 3b and out through the holes 43 then the plastic is moulded over into a round head like a rivet and allowed to cool, thereby providing a permanent attachment of the end plates to the stator portions.

The three one-way valves are all similar to one another. Identical flexible valve members 6, 10, 13, are gripped between identical annular retaining ring members 28, 27, 29, and identical valve seat members 25. The retaining ring members 28, 27, 29 are secured to the piston 1, end plate 21 and end plate 22 respectively for example by a circumferential ultrasonic weld. All of the members 21, 22, 25, 26, 27, 28, 29 and cylinder 9 are of plastic.

Further details of the construction of each of the valves in the illustrated embodiments are as follows. The surface of the pintle against which the flexible valve member engages, preferably with an interference fit, is orientated generally parallel of the axis of the pump. This surface is slightly conical, having an inccluded angle (shown at X in FIG. 4) preferably of about 10°, but it could be up to about 20° or down to 0° (i.e. parallel to the axis) or even slightly negative. The portions of the valve seat between the through holes and extending to and integral with the pintle are also generally conical but have a relatively wide conical angle (shown at Y in FIG. 6), typically of the order of 90° included angle. It is this combination of wide conical angle and the pintle which extends therefrom generally parallel to the axis which makes the valves so successful.

The arrangement of three valves, as described in the embodiments, has the advantage of very efficient pumping, whatever the viscosity or density of the fluid being pumped. High flow rate at high pressure can be attained. However, it has been found surprisingly that the pump will work well with only one valve, the valve in the piston. This arrangement can be used to achieve high flow rate at low pressure, utilizing the inertia of the fluid to open the valve member 6. The pump will also operate with two valves, one valve in the piston and the other either at the inlet or the outlet of the cylinder. This is useful for achieving a high flow rate at low pressure in pumping gases.

The described one way valves are very effective and durable, having a long life (from the fatigue point of view) because the flexible members extend a relatively small amount in opening because of their annular configuration. The periphery and central hole in the flexible members may have any shape but are most conveniently round as in the embodiments. A further advantage is that the seal between the flexible member and rigid pintle is much more effective and long lasting than a seal between two flexible members as seen in some prior art valves. The downstream-swept configuration of valve member together with the support provided by the pintle and the portions of the valve seat members 25 between the holes 26 means that the valve members can withstand very high reverse pressures without unseating, that is being forced upstream out of sealing engagement with the pintle. There may be any number and shape of holes 26 through the valve seat members 25. Typically, there will be a larger number of holes (and smaller relative sizes) with larger sizes of valve.

We claim:

1. An oscillatory pump comprising a cylinder having inlet and outlet ends, a piston having a passageway therethrough and reciprocatable within the cylinder, the piston having a one-way valve arranged to open and close the passageway in the piston, and means for effecting reciprocatory movement of the piston to pump fluid from the cylinder inlet to the cylinder outlet, the valve comprising a valve seat located generally centrally of the passageway, and a generally annular flexible valve member secured at its periphery to the piston and extending over the valve seat, the valve seat having a generally conical first surface portion and a contiguous second surface portion located radially inwardly of the first portion, the valve member having a tip portion for gripping the second surface portion of the valve seat with an interference fit only between said tip portion and the second surface portion of the valve seat so that excess pressure across the valve member in one direction along the passageway causes the flexible valve member to extend away from the valve seat thereby permitting fluid flow in one direction relative to the piston, whereas excess pressure in the other direction urges the flexible valve member to seal against the second surface portion of the valve seat thereby preventing fluid flow in the other direction relative to the piston.

2. An oscillatory pump as claimed in claim 1 wherein the cylinder has normally-closed valves of flexible material fixedly located at the inlet and outlet ends of the cylinder, the passageway in the piston having an inlet and an outlet, so that the piston allows fluid to pass from an inlet chamber formed between the inlet valve and the inlet end of the piston to an outlet chamber formed between the valve of the piston and the outlet valve in response to movement of the piston within the cylinder.

3. An oscillatory pump as claimed in claim 1 wherein the means for effecting reciprocatory movement of the piston within the cylinder comprises energizeable means arranged when energized for moving the piston in one direction within the cylinder, and return means arranged for returning the piston in the opposite direction when the energizeable means is de-energized.

4. An oscillatory pump as claimed in claim 1 wherein at least one resilient skirt is provided on the piston to extend therearound to provide a seal between the piston and cylinder.

5. The oscillatory pump as claimed in claim 1, wherein the valve seat is mounted to the piston and extends across the passageway, the valve seat having at least one hole formed therethrough for fluid flow.

6. The oscillatory pump as claimed in claim 5, wherein the valve member is clampd around its periphery between the generally annular housing member and the valve seat member.

7. The oscillatory pump of claim 1 wherein the first conical surface portion has an included angle of about 90°.

8. The oscillatory pump of claim 7 wherein the second surface portion of the valve seat is conical and has an included angle in the range of 0° to 20°.

9. The oscillatory pump of claim 8 wherein the included angle of the conical second surface portion is about 10°.

10. The oscillatory pump of claim 1 wherein the valve member has a downstream sweep configuration including a first section extending radially in a direction downstream at an angle of about 45°, and a second section extending from the first section for selective engagement with the second surface portion of the valve seat.

* * * * *